US007028784B2

(12) United States Patent
Breitenmoser

(10) Patent No.: US 7,028,784 B2
(45) Date of Patent: Apr. 18, 2006

(54) MOTOR-DRIVEN HAND-HELD TOOL WITH FUNCTIONAL STEP DISPLAY

(75) Inventor: Armin Breitenmoser, Wattwil (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/812,727

(22) Filed: Mar. 30, 2004

(65) Prior Publication Data

US 2004/0188233 A1 Sep. 30, 2004

(30) Foreign Application Priority Data

Mar. 31, 2003 (DE) .......................... 203 05 224 U

(51) Int. Cl.
*B23Q 15/13* (2006.01)

(52) U.S. Cl. ........................ 173/20; 173/170; 200/252; 200/547

(58) Field of Classification Search .................. 173/20, 173/170, 176; 200/16 R–16 F, 308–317, 200/547, 252
See application file for complete search history.

(56) References Cited

U.S. PATENT DOCUMENTS 3,833,784 A * 9/1974 Bobel et al. ............. 200/43.17
3,839,614 A * 10/1974 Saganowski et al. .... 200/43.17
4,021,914 A * 5/1977 Leibundgut et al. ........... 30/392
4,112,271 A * 9/1978 Marchetti ................. 200/52 R
4,441,000 A * 4/1984 Suwa ......................... 200/548
4,581,822 A * 4/1986 Fujimura ..................... 30/216
4,592,144 A * 6/1986 Tolbert et al. ................ 30/394
5,251,637 A * 10/1993 Shalvi ........................ 600/548
5,339,908 A * 8/1994 Yokota et al. .............. 173/216
5,360,073 A * 11/1994 Akazawa ..................... 173/15
5,526,460 A * 6/1996 DeFrancesco et al. ...... 388/831
5,550,416 A * 8/1996 Fanchang et al. ............. 310/83
6,186,709 B1 * 2/2001 Hsu ....................... 408/241 R

* cited by examiner

*Primary Examiner*—Stephen F. Gerrity
*Assistant Examiner*—Thanh Truong
(74) *Attorney, Agent, or Firm*—Abelman, Frayne & Schwab

(57) ABSTRACT

A motor-driven hand-held tool includes a housing (4) having a switching recess (6) formed therein, an actuation member (8) displaceably arranged in the switching recess for shifting a functional unit between different functional steps, and and a functional step display arrangement having a read-out device (16) mechanically connected with the actuation member (8) and a display element (14) provided in the housing (4) for displaying an actual functional step and spaced from the switching recess (6).

3 Claims, 2 Drawing Sheets

MOTOR-DRIVEN HAND-HELD TOOL WITH FUNCTIONAL STEP DISPLAY

BACKGROUND OF THE INVENTION

1. Field of the Invention

The present invention relates to a motor-driven hand-held tool, including a housing having a switching recess formed therein, an actuation member displaceably arranged in the switching recess for shifting a functional unit between different functional steps, and a functional step display arrangement having a read-out device mechanically connected with the actuation member and a display element provided in the housing for displaying an actual functional step.

2. Description of the Prior Art

Motor-driven hand-held tools have usually several functional units which, as required, are shifted between different functional steps such as, e.g. speeds or rotational directions. In order for a hand-held tool user to know, during an operation, at each moment, which functional step is set, many conventional hand-held tools are provided, mostly on the housing, with functional step display means that display an actual functional step, e.g., an actual speed, in form of a figure, letter, or symbol.

U.S. Pat. No. 6,364,580 discloses an electrical drilling and screw-driving tool provided on the housing upper side with a slide switch for switching over the gearing. The slide switch has an actuation member displaceably arranged in a housing recess for shifting between two switching positions, and a slide member which carries the actuation member and which is displaced along the inner side of the housing in the region of the housing recess. The actuation member carries, in the shifting direction of the slide switch, on one of its side a figure "1" and on the other of its side a figure "2." Dependent on the switching position, either the figure "1" for the first speed or the figure "2" for the second speed is visible in the housing recess next to the actuation member, with the other figure being covered by the housing.

German Publication DE-2933355 discloses an electrical hand-held tool which is provided on a housing side with a change-over switch displaceable between two switching positions shown on the housing with figures "1" and "2." The switching position of the change-over switch is transmitted to microcomputer that is connected with a display provided on the upper side of the housing. The display displays a speed number and an associated therewith, actual rotational speed and a number of other operational parameters.

The drawback of both solutions, those of U.S. Pat. No. 6,364,580 and German Publication DE-2933355, consists in that, on one hand, with mechanically operated functional step display means, only two functional steps can be displayed, and the display is effected by the actuation member. Therefore, the known functional step displays are not suitable for functional units having more than two functional steps, such as, e.g., a three-speed gearset. On the other hand, with many hand-held power tools, it is either very difficult to use the actuation member in such a way that a good visibility of the functional step display is insured or, vise versa, the functional step display, in particular during operation, is hardly visible in order to provide for good access to the actuation member. The drawback of electronically operated display means consists in high manufacturing costs of hand-held tool associated with the use of such display means. Moreover, vibrations and impacts that act on hand-held tool during operation, lead often to damage or disruption of operation of such display means.

Accordingly, an object of the present invention to provide functional step display means for motor-driven hand-held tools in which the drawbacks of the known display means are eliminated.

Another object of the present invention is to provide functional step display means with a good visibility of an identification mark and capable to display more than two functional steps.

SUMMARY OF THE INVENTION

These and other objects of the present invention, which will become apparent hereinafter, are achieved by arranging the functional step display means at a distance from the switching recess.

The advantage of spacing of the functional step display means from the switching recess consists in that it can be made, on one hand, very robust from the mechanical point of view and, on the other hand, the display means provides for a good serviceability of the actuation member and for an optimal visibility of the identification marks. In addition, the provision of a read-out device, which forms part of display means and is, thus separated form the actuation member, provides additional possibility of displaying of more than two functional steps.

Advantageously, the display means is formed by a recess provided in the housing, with both the switching recess and the display means recess being formed in an upper, with respect to the handle, surface or side of the housing. Thereby, on one hand, during an operation, a good visibility of marks is insured. On the other hand, because of the provision of both recesses on the upper side of the housing, the housing can be cost-effectively produced by casting.

Advantageously, the mechanical connection between the read-out device and the actuation member is formed by a slide member which insures a reliable actuation of the read-out device and thereby, each time, a correct display of an actual functional step.

According to a particularly advantageous embodiment of the present invention, the read-out device has a plurality of arranged in row, one after another marks e.g., in form of figures, letters or like symbols for identifying a respective functional step and carried, in a region of the display element, on the slide member. In each position of the side member, at most, only one identifying mark is completely displayed by the display element. In this way, there is provided simply functional step display means which can be used for displaying of more than two functional steps.

Advantageously, the slide member is provided with at least one locking member adapted to engage in a respective matching locking element provided on the housing at least in two positions of the slide member relative to the housing. In this way, predetermined positions for the slide member and the actuation member relative to the housing can be established in which the functional steps are precisely set and with which, a disturbance-free shifting of the functional unit is insured. A further advantage of the locking means according to the present invention consists in that the locking positions can be so selected that the mark, which corresponds to a respective functional step, is completely visible in the display means, with other marks being completely covered by the housing.

Advantageously, the actuation member is formed on the slide member in order to achieve as direct as possible actuation of the slide member during the shifting process, which insures a reliable display of the actual functional step. Further, forming the actuation member, the slide member, and the read-out element as a one-piece part provides for a very cost-effective manufacturing of the functional display means.

The novel features of the present invention, which are considered as characteristics for the invention, are set forth in the appended claims. The invention itself, however both as to its construction and its mode operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 2:
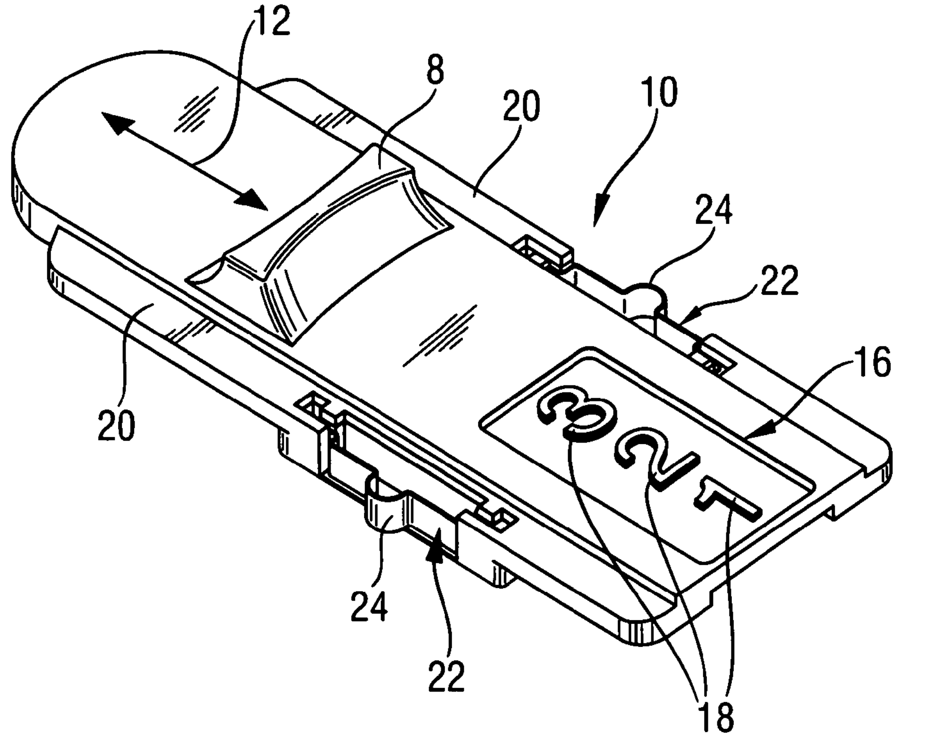
FIG. 2 a perspective view of a slide member with a display device and an actuation member.

FIG. 2 shows an upper, remote from a handle (not shown), side of a hand-held power tool 2 which is formed as a drilling and screw-driving tool. The hand-held power tool has a housing 4 in which a switching recess 6 is formed. Through the switching recess 6, an actuation member 8 in form of a slide switch projects. The slide switch is provided on an upper side of a slide member 10. The actuation member 8 is used, together with the slide member 10 for switching between three-speeds of a gearset (not shown). To this end, the slide member 10 is supported on the inner side of the housing 4 for reciprocating movement in an actuation direction 12, shown with a double arrow.

As shown with dash lines, in an invisible region of the housing 4, the slide member 10 projects above display means 14 formed as a recess in the housing 4, with the display means 14 being spaced from the switching recess 6 in the actuation direction 12.

Figure 3:
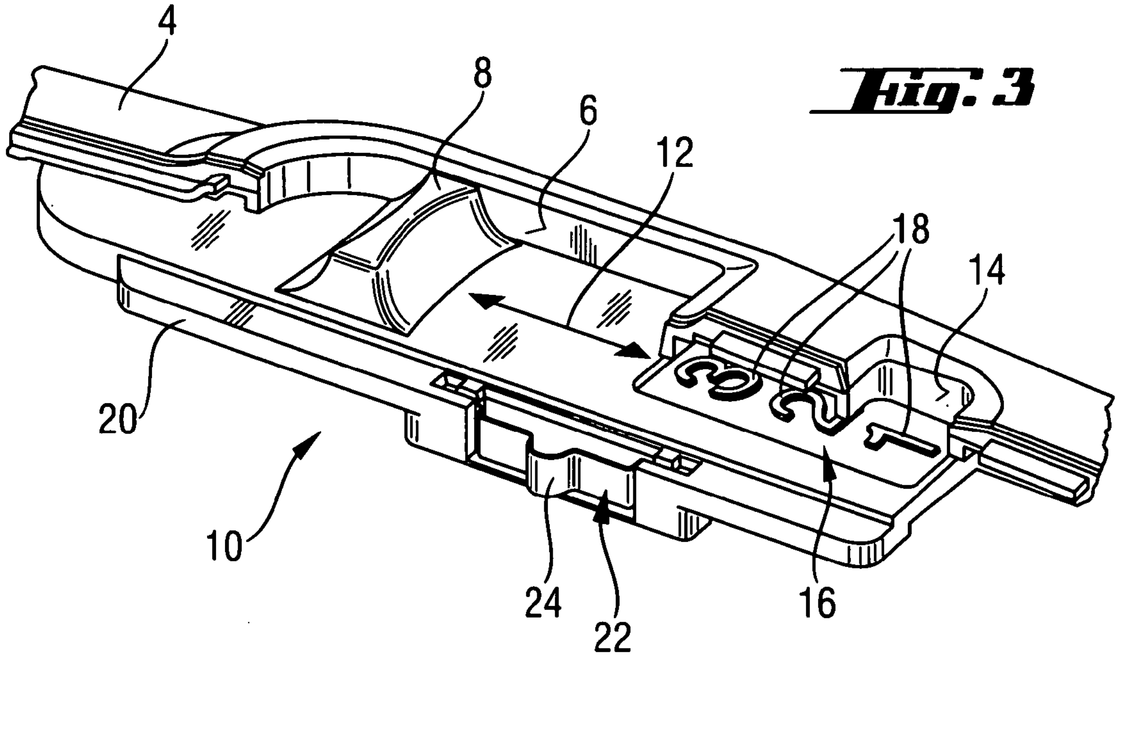
FIG. 3 a perspective view of the slide member shown in FIG. 2 in a mounted condition with a partial view of a housing half.

FIGS. 2 and 3 show a detailed view of the slide member 10. As shown in FIGS. 2–3, at one end of the slide member 10, there is provided a read-out device 16 in form of an embossing having three identification marks 18 in form of figures “1,” “2,” and “3.” The three marks 18 are arranged in a row in the actuation direction 12.

As it is particularly shown in FIG. 3, the distance between the marks 18 in the read-out device 16 is so adapted to the size of the display means 14 that only one mark 18 is visible form outside, with two other marks 18 being covered by the housing 4. Each displayed mark 18 corresponds to a speed of the hand held power tool 2 set by the actuation member 8.

As shown in FIGS. 2–3, the slide member 10 has two side guide elements 20 which substantially extends in the actuation direction 12. A locking member 22 in form of a detent spring in provided in each of the guide elements 20. The locking member 22 projects from the guide element 20 transverse to the actuation direction 12.

Figure 1:
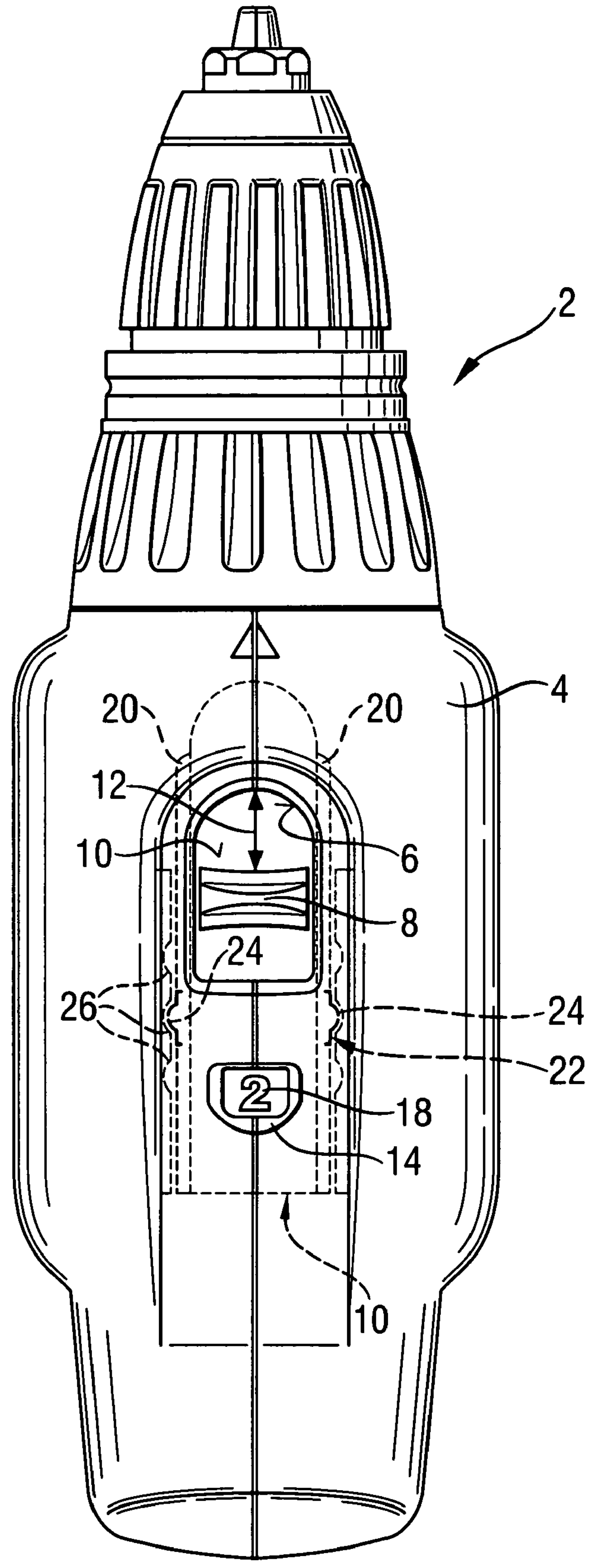
FIG. 1 a plan view of an upper side of a hand-held power tool according to the present invention.

In order to insure a precise setting or display of the actual speed, there is provided on the housing 4, as shown with dash lines in FIG. 1, for each speed, matching locking means 26 in form of locking cavities. A locking nose 24 of the locking member 22 can engage in each of the cavities of the locking means 26 when the slide member 10 occupies a corresponding exact position relative to the housing 4. The slide member 10 has a precisely predetermined position relative to the housing 4 for each of the three speeds. These positions of the slide member 10, on one hand, exactly set the speed and, on the other hand, provide for a complete display of the corresponding mark 18 by the display means 14.

In order to set another speed of the hand-held power tool 4, the actuation member 8 is displaced in the actuation direction 12. To this end, the engagement between the locking element 22 and the counter or matching locking means 26, which sets a certain speed, is released. By displacing the actuation member 8, the slide member 10, together with the locking nose 24, is displaced into a position in which the display device 14 displays a mark 18 of the desired speed. In this position of the slide member 10, the locking nose 24 engages in that cavity of the matching locking means 26 which serves for a precise setting of the new speed.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A motor-driven hand-held tool, comprising a housing (4) having a switch recess (6) formed therein, and an actuation member (8) displaceably arranged in the switching recess (6) for shifting a functional unit between different functional steps; and functional step display means including a read-out device (16) having a plurality of marks (18) for identifying respective functional steps, means for mechanically connecting the read-out device (16) with the actuation member (8) and carrying the identifying marks (18), and display means (14) provided in the housing (4) for displaying the identifying marks (18) and spaced from the switching recess (6), the mechanically connecting means having a plurality of different positions corresponding to the different functional steps, and the display means (14) displaying only one identifying mark, which corresponds to an actual functional step, in each position of the mechanically connecting means, wherein the display means (14) is formed by a recess provided in the housing, and wherein both the switching recess (6) and the display means recess (14) are formed in an upper, with respect to the handle, surface of the housing (4), wherein the mechanically connecting means comprises a slide member (10) formed, together with the actuation (8) member, as a one-piece element, and wherein the marks (18) are arranged on the slide (10) in a row, one after another, and wherein the slide (10) is displaceable in a region of the display means (14).

2. A motor-driven hand-held tool according to claim 1, wherein the slide member (10) has at least one locking member (22) engageable in respective matching locking means (26) provided on the housing (4) at least in two positions of the slide member (10) relative to the housing (4).

3. A motor driven hand-held tool according to claim 1, wherein the actuation member (8) is provided on the slide member (10).

* * * * *